June 10, 1924.　　　　　　　　　　　　　　　1,497,550
J. H. COYNE
LIQUID LEVEL INDICATOR
Filed Aug. 16, 1919
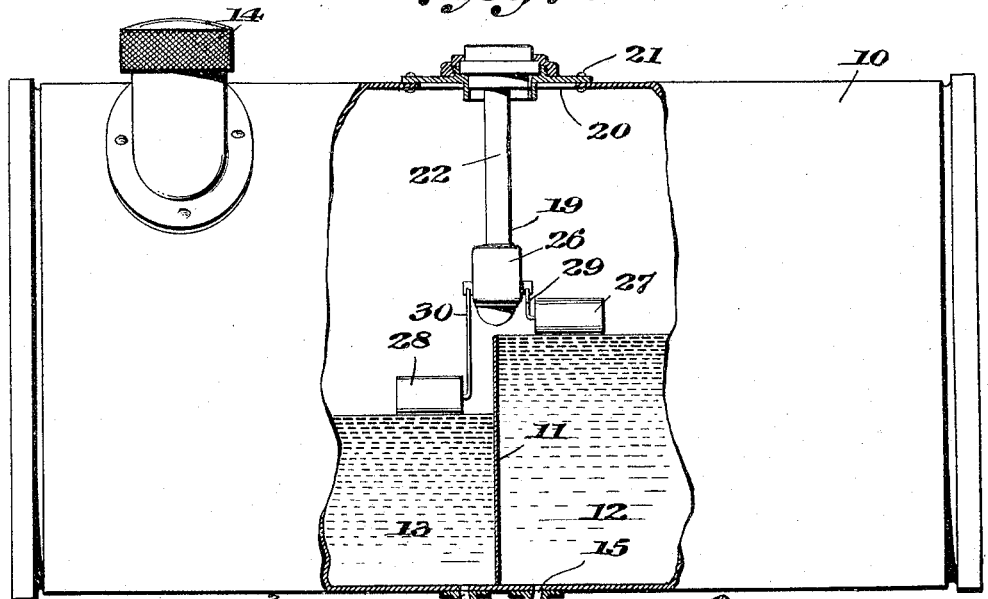
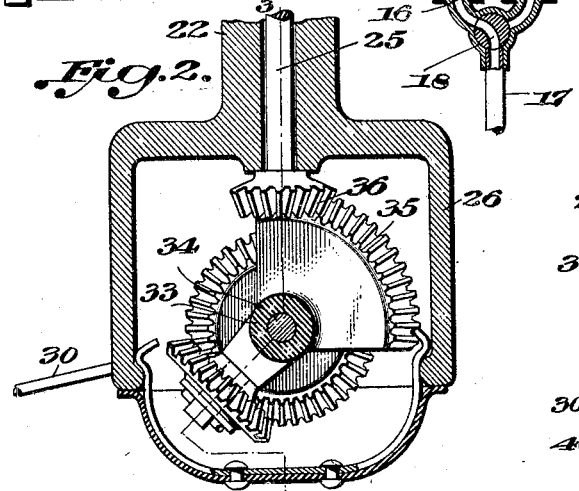
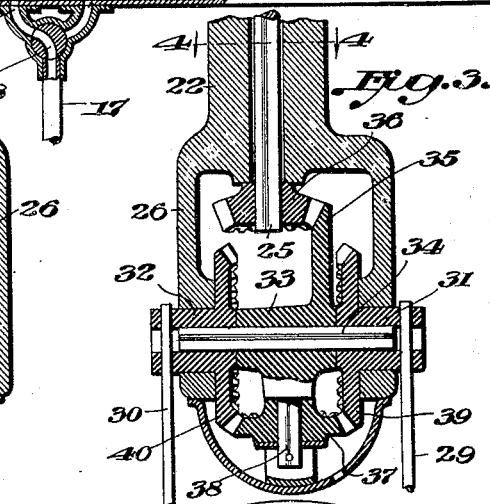
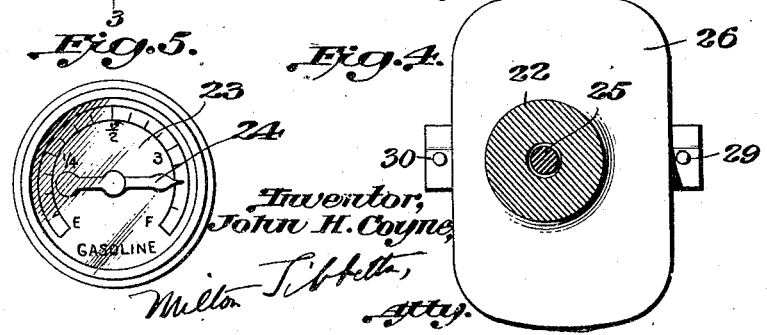
Inventor,
John H. Coyne,
By Milton Tibbetts,
Atty.

Patented June 10, 1924.

1,497,550

UNITED STATES PATENT OFFICE.

JOHN H. COYNE, OF DETROIT, MICHIGAN, ASSIGNOR TO PACKARD MOTOR CAR COMPANY, OF DETROIT, MICHIGAN, A CORPORATION OF MICHIGAN.

LIQUID-LEVEL INDICATOR.

Application filed August 16, 1919. Serial No. 317,843.

*To all whom it may concern:*

Be it known that I, JOHN H. COYNE, a subject of the King of Great Britain, and resident of Detroit, Wayne County, State of Michigan, have invented certain new and useful Improvements in Liquid-Level Indicators, of which the following is a specification.

This invention relates to liquid level indicators and particularly to indicators that are adapted to operate where more than one liquid level is concerned.

A specific application of the invention is shown in a motor vehicle gasoline tank in which the indicator is connected to show the amount of gasoline in a tank in which there is a partition extending upwardly part way only from the bottom of the tank.

One of the well known forms of gasoline tanks in use today on motor vehicles is that in which the lower part of the tank is divided as referred to above. This is for the purpose of having a reserve supply of gasoline in the tank after the liquid has been drawn from the upper part of the tank and from one of the compartments. With any of the indicators heretofore used with such tanks, it has been impossible to correctly determine the amount of gasoline in the tank after the level falls below the top of the partition. A single float only has been used and that float, of course, must be arranged either on one side or the other of the partition, so that it can only indicate the liquid level on that side of the partition. If the float happens to be in the compartment that is to constitute the reserve, it will not fall with the liquid level in the other compartment and consequently will erroneously indicate that the gasoline in the tank is level with the top of the partition. On the other hand, if the float is not on the reserve side of the partition, it will incorrectly indicate that the tank is empty, when, as a matter of fact, there is a reserve on the other side of the partition.

One of the objects of the present invention is to provide a means for substantially correctly indicating the amount of gasoline or other liquid in a tank of the above description regardless of upon which side of the partition the reserve supply is located.

Doubtless the invention is capable of other uses than the particular one herein specifically shown and described, and it will be understood that such other uses and objects are clearly within its scope.

Referring to the drawings, which show a particular embodiment of the invention:

Figure 1 represents a gasoline tank in elevation, with parts broken away to show the interior construction, and with an indicator made in accordance with this invention mounted in the tank;

Figure 2 is an enlarged vertical sectional view of the gearing and connections of the indicator;

Figure 3 is a vertical section substantially on the line 3—3 of Figure 2;

Figure 4 is a transverse section on line 4—4 of Figure 3; and

Figure 5 is a plan view of the indicator hand and dial on top of the tank.

A fuel tank is represented at 10 and is formed with a partition 11 extending upwardly from the bottom of the tank. As shown, this partition extends transversely of the tank at the middle thereof to a point about half way up from the bottom. This provides two independent compartments, 12 and 13, at the sides of the partition 11.

The tank is formed with a filling opening 14 and with outlets 15 and 16 from the bottoms of the respective compartments. These outlets connect with a supply line 17 through a switch valve 18 shown in section in Figure 1. It will be seen that the valve 18 may be turned to connect either the outlet 15 or the outlet 16 with the supply line 17, but when one is connected the other is shut off. In Figure 1 the valve 18 is turned to connect the outlet 16 with the supply line 17 and it will be understood that when all of the liquid has been drawn from the compartment 13 a reserve supply will still be retained in compartment 12 up to the top of the partition 11. This reserve supply may be withdrawn by turning the valve 18 to connect the outlet 15 with the supply 17.

It will be seen also that it is immaterial in which position the valve 18 is when the tank is refilled, as in either position one of the compartments will act as a reserve supply.

The liquid level indicator of this invention is shown in the form of a unit 19, which may be inserted through an opening 20 in the top of the tank 10 and connected to the tank as by rivets 21. The unit comprises a support 22 which may be a casting, and a dial 23 with suitable graduations thereon is arranged in the top of this casting. An indicating hand 24 is mounted on a vertical shaft 25 in the support 22. The dial and hand are shown particularly in Figure 5, while in Figure 2 the lower part of the shaft 25 will be seen as extending down through the support 22 and into an enlarged part of that support, which is in the form of a casing 26.

The two floats for operating the indicator are supported by the casing 26, and the connections between the floats and the shaft 25 are housed within the casing. The floats are shown at 27 and 28 on arms 29 and 30 respectively, which arms are connected to oscillating members 31 and 32 mounted in the casing 26. An oscillating device 33 is mounted coaxially with the members 31 and 32, a pin 34 being provided for this purpose.

The oscillating device 33 has connections both to the shaft 25 and to the members 31 and 32. The connection to the shaft 25 is through a segment 35 on the device 33 and a pinion 36 on the lower end of the shaft 25. Thus the shaft 25 is oscillated or rotated and with it the hand 24 as the member 33 is oscillated. The connection to the members 31 and 32 is in the nature of a differential connection, the specific mechanism shown being a bevel pinion 37 rotatively mounted on a pin 38 on the member 33, which pinion meshes with bevel gears 39 and 40 on the members 31 and 32 respectively. This provides positive operating connections from the floats 27 and 28 to the indicating hand 24, so that certain movements of the floats will produce certain movements of the hand. Also, it will be noted that the arms 29 and 30 extend in the same direction from the axis of the members to which they are connected, so that as the floats rise or fall together a similar movement of the gears 39 and 40 will be produced.

In operation, with the tank full of liquid, the floats will be at their highest level, and, of course, at the same level. The gearing and the relative positions of the hand and dial are such that when the floats are in this position the hand will indicate on the dial that the tank is full. As the liquid is withdrawn from the tank down to the level of the top of the partition 11, both floats will fall to the liquid level and carry with them the gears 39 and 40 and the pinion 37, and thus oscillate the device 33 so that the shaft 25 and its hand 24, through the geared connection 35, 36, will be rotated or oscillated and the hand 24 will indicate the lowering of the liquid level down to the half way mark on the dial. From that time on, with the switch valve 18 in the position shown in Figure 1, the liquid will be drawn from the compartment 13 only, and consequently the float 27 will remain in its half way position and the float 28 will drop with the liquid level in the compartment 13. In dropping the float 28 will carry with it the bevel gear 40, and since the float 27 and its gear 39 remain stationary, the gear 40 will turn the pinion 37 and the latter will run around the gear 39 so that the device 33 will be oscillated at approximately half the speed of the gear 40. This will cause the indicating hand 24 to move downwardly more slowly than as if both floats were moving downwardly, and consequently when the float 28 has reached the bottom of the compartment 13 the indicating hand will have moved around to the position of one-quarter full on the dial. If the valve 18 is then turned so that the liquid will flow from compartment 12, float 27 will drop with the level of liquid in that compartment and the gear 39 will operate the oscillating device 33 through the pinion 37, so that the indicating hand 24 will move to the empty position of the tank. From this it will be seen that the connections from the floats to the hand are such that the hand will indicate the amount of liquid in the tank as the level drops down to the top of the partition 11 and from that point on will indicate the sum of the amounts of liquid in the two compartments 12 and 13.

Although one specific embodiment of the invention has been illustrated and described, it will be understood that the invention is capable of modification and that changes and modifications in the construction and in the arrangement of the cooperating parts may be made without departing from the spirit or scope of the invention as expressed in the following claims.

What I claim and desire to secure by Letters Patent is:—

1. The combination with a motor vehicle fuel tank divided into two compartments, of a liquid level indicator comprising an indicating hand located outside the tank, a float in each compartment, and transmission mechanism within the tank, said mechanism including epicylic gearing between the floats and hand rendering said hand responsive to the algebraic sum of the vertical movements of said floats.

2. The combination with a motor vehicle fuel tank having a partition therein dividing the lower part thereof into two compartments, of a liquid level indicator comprising an indicating hand located outside the tank, a float on each side of the plane of said partition, and transmission mechanism within the tank, said mechanism including differential gearing between the floats and hand rendering said hand responsive to the algebraic sum of the vertical movements of said floats.

3. The combination with a tank divided into two compartments, of a liquid level indicator comprising an indicating hand located outside the tank, a float in each compartment, and a transmission mechanism within the tank, said mechanism including differential gearing between the floats and hand rendering said hand responsive to the algebraic sum of the vertical movements of said floats.

4. The combination with a tank having a partition therein dividing the lower part thereof into two compartments of substantially equal volume, of a liquid level indicator comprising an indicating hand located outside the tank, a float in each compartment, and a transmission mechanism within the tank, said mechanism including epicyclic gearing between the floats and hand rendering said hand responsive to the algebraic sum of all vertical movements of both floats.

5. The combination with a tank having a partition therein dividing the lower part thereof into two compartments, of a liquid level indicator comprising an indicating hand located outside said tank, a shaft connected to said hand and projecting into said tank, a gear on the projecting end of said shaft, a second shaft supported transversely to said first shaft, a gear segment pivoted on said second shaft meshing with said gear, a planetary pinion revolubly mounted on a bearing rigid with said gear segment, two equal gears mounted on said second shaft and meshing with opposite sides of said pinion, an arm operably connected with each of said last mentioned gears, and a float on the outer end of each arm, the floats being located on the opposite sides of the said partition.

6. The combination with a tank having a central partition therein dividing the lower part thereof into two compartments of substantially equal volume, of a liquid level indicator comprising an indicating hand located outside said tank, a shaft connected to said hand and projecting into said tank, a bevel gear on the end of said shaft, a second shaft supported at right angles to said first shaft, a bevel segment pivoted on said second shaft meshing with said bevel gear, a planetary bevel pinion revolubly mounted on a bearing rigid with said bevel segment, two equal bevel gears mounted on said second shaft meshing with opposite sides of said bevel pinion, an arm rigid with each of said last mentioned bevel gears, and a float on the outer end of each arm, said floats being located on opposite sides of said partition.

7. The combination with a tank having a partition therein dividing the lower part thereof into two compartments, of a liquid level indicator comprising a support mounted in an aperture in the upper part of said tank, an indicator carried at the upper end of said support, a shaft journaled in said support having connection between the upper end thereof and said indicator, a pair of crank arms having floats connected to their outer ends, said floats being located on the opposite sides of said partition, and differential gearing connecting the inner ends of said crank arms to the lower end of said shaft.

8. The combination with a tank having a partition therein, of a liquid level indicator comprising a casing mounted in an aperture in the upper part of the tank and consisting of an elongated hollow member terminating in a housing at each end, an indicator hand mounted in the upper housing, a shaft in said hollow member having connection between the upper end thereof and said indicator, a pair of arms pivoted transversely in said lower housing having floats connected to their outer ends, said floats being located on opposite sides of said partition, and differential gearing in said lower housing connecting said arms with the lower end of said shaft operating to render said indicator hand responsive to the vertical movements of each float irrespective of the movements of the other float.

9. The combination with a tank having a partition therein dividing the lower part thereof into two compartments, of a liquid level indicator comprising a casing mounted in an aperture in the upper part of the tank and consisting of an elongated hollow member terminating in a housing at each end, said casing being in substantial alignment with said partition, an indicator hand mounted in the upper housing, a shaft rotatable in said hollow member and having connection between its upper end and said indicator a pair of arms pivoted in said lower housing on a transverse axis, floats connected to said arms and located on opposite sides of said partition, and epicyclic gearing in said lower housing connecting said arms with the lower end of said shaft.

10. The combination with a motor vehicle fuel tank divided into two compartments; of a liquid level indicator comprising an indicating member visible from the outside of the tank, a float in each compartment, and transmission mechanism between the floats and said member to transmit the algebraic sum of the movements of both floats to said member, whereby the member indicates the total of the levels of liquid in the two compartments.

11. The combination with a motor vehicle fuel tank divided into two compartments; of a single means to indicate the algebraic sum of the levels of liquid in the two compartments.

12. The combination with a motor vehicle fuel tank divided into two compartments; of a unitary means rigidly carried by and within the tank to indicate the algebraic sum of the levels of liquid in the two compartments.

13. The combination with a motor vehicle fuel tank divided into compartments; of an indicator rigidly carried by the tank, a float in each compartment and mechanism rigidly carried by the tank operatively connecting the floats and said indicator constructed and arranged to move the indicator in accordance with the algebraic sum of the liquid levels in the compartments.

14. The combination with a motor vehicle fuel tank divided into two compartments, having a common discharge pipe, an outlet from each tank connected to said discharge pipe and valve means to permit discharge from one compartment only at a time; of a single device for indicating the sum of the levels of liquid in the two compartments.

15. The combinatiion with a motor vehicle fuel tank divided into two compartments, and having means for permitting discharge from one compartment only at a time; of a single unitary device for indicating the sum of the liquid levels in the two compartments.

16. The combination with a motor vehicle fuel tank divided into two compartments, and having means for permitting discharge from one compartment only at a time; of a single indicator carried by the tank, and means rigidly carried within the tank to actuate the indicator in accordance with the algebraic sum of the liquid levels in the two compartments.

17. An indicating device comprising in combination, a support, a shaft carried by said support, an index connected to be operated by said shaft, a second shaft carried by said support, two gears mounted on said second shaft, a float connected with each of said two gears, a planet gear operatively connecting said two gears, and means for transmitting rotation of said planet gear in its orbit to said first shaft.

18. An indicating device comprising in combination, a support, a shaft carried by said support, an indicating hand secured to said shaft, a bevel gear secured to said shaft, a transverse shaft carried by said support, two bevels gears oppositely disposed on said transverse shaft, a float connected with each of said two bevel gears, a planet gear meshing with said two bevel gears, and a bevel gear carrying said planet gear and meshing with said first mentioned gear.

In testimony whereof I affix my signature.

JOHN H. COYNE.